US008230149B1

(12) United States Patent
Long et al.

(10) Patent No.: US 8,230,149 B1
(45) Date of Patent: Jul. 24, 2012

(54) METHOD AND APPARATUS FOR MANAGING A PERIPHERAL PORT OF A COMPUTER SYSTEM

(75) Inventors: Ngo Bach Long, Vancouver (CA); Kevin Bradley Citterelle, Coquitlam (CA); Edlic Yiu, Burnaby (CA)

(73) Assignee: Teradici Corporation, Burnaby, British Columbia (CA)

( * ) Notice: Subject to any disclaimer, the term of this patent is extended or adjusted under 35 U.S.C. 154(b) by 14 days.

(21) Appl. No.: 12/284,765

(22) Filed: Sep. 25, 2008

Related U.S. Application Data

(60) Provisional application No. 60/975,445, filed on Sep. 26, 2007.

(51) Int. Cl.
G06F 13/14 (2006.01)
G06F 7/00 (2006.01)
G06F 12/14 (2006.01)

(52) U.S. Cl. ............... 710/305; 710/8; 710/62; 726/21; 726/27

(58) Field of Classification Search .......... 710/300–306, 710/8, 10, 62, 63, 72; 726/4–5, 7, 11, 13, 726/21, 17, 26–30, 34
See application file for complete search history.

(56) References Cited

U.S. PATENT DOCUMENTS

| | | | |
|---|---|---|---|
| 5,857,024 A * | 1/1999 | Nishino et al. ............... 713/172 |
| 5,883,670 A | 3/1999 | Sporer et al. | |
| 6,199,137 B1 | 3/2001 | Aguilar et al. | |
| 6,205,479 B1 | 3/2001 | Dulai et al. | |
| 6,470,436 B1 | 10/2002 | Croft et al. | |
| 6,564,215 B1 * | 5/2003 | Hsiao et al. ............... 1/1 |
| 6,583,887 B1 | 6/2003 | Clouthier et al. | |
| 6,708,247 B1 | 3/2004 | Barret et al. | |
| 7,111,324 B2 * | 9/2006 | Elteto et al. ............... 726/9 |
| 7,290,072 B2 * | 10/2007 | Quraishi et al. ............... 710/105 |
| 7,464,212 B2 * | 12/2008 | Narad ............... 710/300 |
| 7,539,863 B2 * | 5/2009 | Phillips et al. ............... 713/168 |
| 7,574,545 B2 * | 8/2009 | Keeney et al. ............... 710/220 |
| 7,613,862 B2 * | 11/2009 | Mihai ............... 710/300 |
| 7,725,731 B2 * | 5/2010 | Brown et al. ............... 713/183 |
| 7,788,425 B2 * | 8/2010 | Ikemoto ............... 710/36 |
| 7,925,729 B2 | 4/2011 | Bush et al. | |
| 2003/0208698 A1 * | 11/2003 | Chou et al. ............... 713/202 |
| 2004/0003262 A1 | 1/2004 | England et al. | |
| 2005/0028172 A1 * | 2/2005 | Yoshikawa et al. ............... 719/321 |
| 2005/0240685 A1 | 10/2005 | Keys | |
| 2006/0037015 A1 * | 2/2006 | Mihai ............... 717/176 |
| 2006/0069458 A1 | 3/2006 | Lee et al. | |
| 2007/0118645 A1 | 5/2007 | Suters | |
| 2007/0276966 A1 | 11/2007 | Paul et al. | |
| 2007/0288623 A1 * | 12/2007 | Kato et al. ............... 709/223 |

(Continued)

OTHER PUBLICATIONS

"XCalibur Global—Administrator's Guide Document Version 1.0", DG018U-1.0 Chip PC Inc., Topaz House, Nahum Hat 5, P.O. Box 4, Tirat Carmel, 39100, Israel, Sep. 2006, pp. 1-106.

(Continued)

*Primary Examiner* — Mark Rinehart
*Assistant Examiner* — Trisha Vu
(74) *Attorney, Agent, or Firm* — Moser Taboada

(57) ABSTRACT

A method and apparatus for managing a peripheral port of a computer system by identifying, within the computer system, a descriptor list for a peripheral device and manipulating the descriptor list to manage communications between a peripheral device and resources of the computer system via the peripheral port.

37 Claims, 6 Drawing Sheets

U.S. PATENT DOCUMENTS

| | | | | |
|---|---|---|---|---|
| 2008/0005432 A1* | 1/2008 | Kagawa | | 710/106 |
| 2008/0235520 A1* | 9/2008 | Becker et al. | | 713/189 |
| 2008/0307109 A1* | 12/2008 | Galloway et al. | | 709/232 |
| 2009/0024746 A1* | 1/2009 | Welch | | 709/228 |
| 2009/0183254 A1* | 7/2009 | Franco et al. | | 726/17 |

OTHER PUBLICATIONS

"SafeEnd, The USB Port Protector™", Corporate Brochure, BRO-Protector, Revision B, Nov. 2004. Safend Inc., 2, Penn Center, Suite 300, Philadelphia, PA 19102, USA. © Copyright Safend, 2004, pp. 1-4.

U.S. Appl. No. 11/711,366, filed Feb. 27, 2007, Topp et al.

U.S. Appl. No. 12/009,558, filed Jan. 18, 2008, Hobbs et al.

Non-Final Office Action dated Jun. 20, 2011, for U.S. Appl. No. 12/009,558.

Non-Final Office Action mailed May 12, 2010 for Co-Pending U.S. Appl. No. 11/613,981 entitled "Methods for Apparatus for Communications Between a Virtualized Host and Remote Devices", 27 pages.

"USB/IP —a Peripheral Bus Extension for Device Sharing over IP Network", Takahiro Hirofuchi, Eiji Kawai, Kazutoshi Fujikawa, Hideki Sunahara, Nara Institute of Science and Technology, Ikomo, Japan, FREENIX Track: 2005 USENIX Annual Technical Conference, 14 pages.

* cited by examiner

METHOD AND APPARATUS FOR MANAGING A PERIPHERAL PORT OF A COMPUTER SYSTEM

CROSS-REFERENCE TO RELATED APPLICATIONS

This application claims priority to U.S. provisional patent application Ser. No. 60/975,445, filed Sep. 26, 2007 and herein incorporated by reference. This application discloses subject matter related to U.S. patent application Ser. No. 11/278,378, filed Mar. 31, 2006, entitled "System and Methods for Bridging a USB Connection" and incorporated herein by reference in its entirety.

BACKGROUND OF THE INVENTION

1. Field of the Invention

Embodiments of the present invention generally relate to techniques for preventing unauthorized devices from connecting to a computer and, more specifically, to a method and apparatus for authorizing connections between a peripheral device and a computer system by evaluating device descriptors and modifying connection or transaction sequences to prevent unauthorized device communication.

2. Background of the Invention

Recently, personal media devices such as PDAs, smart phones, digital cameras, MP3 players and others have gained wide popularity in corporate and personal computing environments. This has been coupled with a massive increase in the available storage capacity of both integrated memory components and a class of devices known as transient storage devices (TSDs), such as USB flash drives. TSDs are easily connected to the peripheral interface of a networked enterprise computer and therefore pose a significant risk to corporate security, in terms of the management and protection of corporate intellectual property, network vulnerability and enforcement of other corporate policies.

One method of protecting a peripheral interface, such as a USB port, is to use a commercially available, software-based port monitor. These products provide administrated device authorization based on USB device identification, such as device class or a unique ID. However, software-based port protection is vulnerable to tampering, requires administration and maintenance, consumes computer resources, and may affect the performance of computer applications or legitimate peripheral devices.

There is a need in the art for improved techniques for managing peripheral ports without increased performance overhead.

SUMMARY OF THE INVENTION

Embodiments of the present invention comprise a method and apparatus for managing a peripheral port of a computer system by identifying, within the computer system, a descriptor list for a peripheral device and manipulating the descriptor list to manage communications between a peripheral device and resources of the computer system via the peripheral port.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of various embodiments of the present invention, numerous specific details are set forth to provide a thorough description of embodiments of the invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
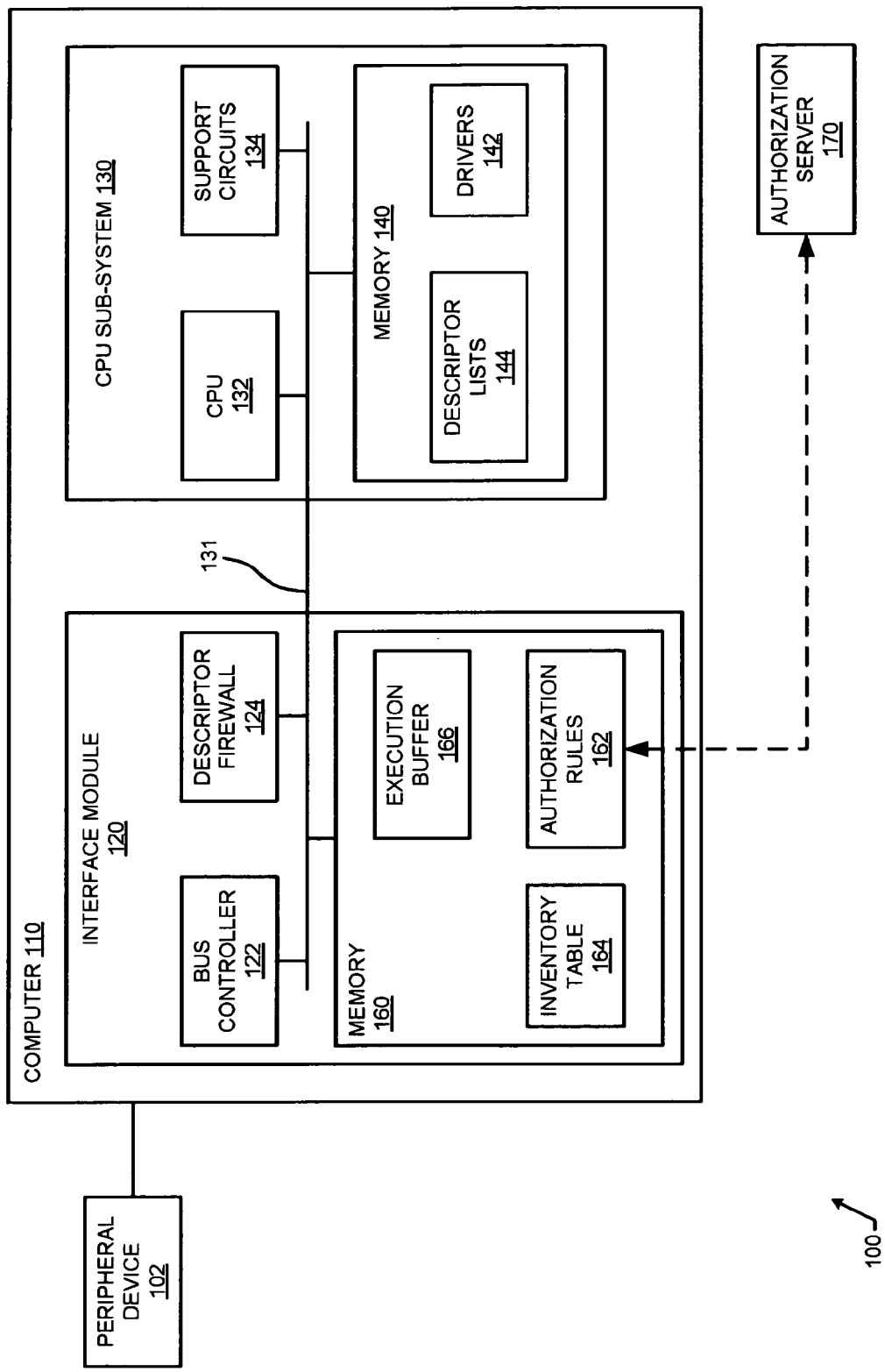
FIG. 1 is a block diagram of a computer system comprising a peripheral port for connecting a peripheral device to an interface module of a host computer in which the interface module comprises a descriptor firewall enabled to execute device authorization functions.

FIG. 1 is a block diagram of an embodiment of a computer system 100 comprising a peripheral port for connecting a peripheral device to resources of a computer incorporating device authorization functions accomplished by the present invention. Various other system embodiments are also described in subsequent sections of this specification.

Computer system 100 comprises a computer 110 having an interface module 120 forming a peripheral port to which a peripheral device 102 may be connected. Module 120 serves as an interface between device 102 and Central Processing Unit (CPU) sub-system 130 of computer 110. The interface module 120 manages the communication between the peripheral device and resources of the computer system. Such resources comprise one or more attributes, functions, or components that may communicate with a peripheral device through a peripheral port in a computer environment, including memory resources, computational resources of a processor, computer peripheral resources, security resources, software processes, and the like. In an embodiment, device 102 is a Universal Serial Bus (USB) device such as a mouse, keyboard, printer, mass storage device or the like. In some embodiments, device 102 is a hub or a compound device comprising a hub and one or more functional devices, in which case additional ports are typically available for the connection of one or more peripheral devices (or additional child hubs) behind it.

In an embodiment such as system 100 of FIG. 1, interface module 120 comprises bus controller 122, descriptor firewall 124, memory 160 and other well known circuit elements such as a root hub and USB bus transceivers omitted from FIG. 1, connected to one another and CPU sub-system by one or more busses such as one or more computer data busses (e.g., a Peripheral Component Interconnect (PCI) bus, PCI-EXPRESS bus or the like) and/or embedded busses (e.g., an AMBA bus). In some embodiments, bus controller 122 is an industry-compliant bus controller such as any of several bus controllers known in the art. In accordance with one embodiment of the invention, the bus controller operates with descriptor firewall 124 to process descriptor lists 144, subject to authorization rules 162 in memory 160. In one USB embodiment, bus controller 122 is compliant with Open Host Controller Interface (OHCI) specifications, including OHCI specification revision 1.0a published by Compaq, National and National Semiconductor. In another embodiment, bus controller 122 is compliant with Enhanced Host Controller Interface (EHCI) specifications, including EHCI Specification Revision 1.0 published by Intel Corporation. Other embodiments are compliant with Universal Host Controller Interface (UHCI), Wireless Host Controller Interface (WHCI) or combinations such as combined OHCI/EHCI compliance. Other embodiments conform with advancements in these or other USB or similar specifications not material to aspects of the present invention.

In another embodiment, device 102 is a FIREWIRE or BLUETOOTH device and bus controller 122 is compliant with IEEE1394/FIREWIRE or BLUETOOTH host controller specifications. It will be appreciated by those of ordinary skill in the art that in some embodiments, module 120 connects to multiple peripheral devices, either directly or indirectly in cases where one or more hubs are present in the connection topology. In an exemplary USB embodiment, module 120 comprises a root hub with four ports for connecting four devices.

In various other embodiments, bus controller 122 comprises one or more modifications to one or more of the industry-compliant bus controllers listed above. In one embodiment, the modifications comprise support for compatibility with extended descriptors such as extended end point descriptors (ED) and/or transfer descriptors (TD) descriptors. In an embodiment, the extended descriptors comprise a programmable tag used to flag the authorization state associated with the descriptor. The modified bus controller (referred to as bus controller 122) comprises exception processing logic that enables a descriptor processing engine to selectively process descriptors based on the state of the authorization flag in the descriptor extension. In an exemplary embodiment, descriptors with the authorization flag set are executed while descriptors with the authorization flag negated are prevented from being executed.

In an embodiment, descriptor firewall 124 is a logic sequencer or microprocessor (such as a MIPS, ARM or X86 class embedded microprocessor) and associated machine executable instructions that establishes the identity of connected devices, for example, using a transfer snooping method described below. Firewall 124 also prevents execution of unauthorized descriptors by preventing complete execution of descriptors associated with unauthorized devices, for example, by tagging descriptors associated with unauthorized devices or by modifying selective unsecure descriptors in execution buffer 166. For example, in an embodiment, TDs associated with authorized EDs are executed by bus controller 122 in an industry-compliant manner, while TDs associated with unauthorized endpoints are modified by firewall 124 to prevent execution. In an exemplary OHCI embodiment, TDs are de-linked from unauthorized endpoints and thereby hidden from the bus controller. The TD tail pointer is not updated. In an exemplary EHCI embodiment, the ACTIVE bit is negated to prevent execution. In an embodiment comprising a bus controller 122 with the modifications described above, descriptor firewall 124 tags unauthorized descriptors in execution buffer 166 so that bus controller 122 does not execute them. Consequently, data associated with an unauthorized device is prevented from being communicated from secure CPU sub-system memory 140 to the device 102 or visa versa.

Memory 160 is memory such as Random Access Memory (RAM), DRAM, SRAM, DDR RAM, XDR RAM or the like connected to bus controller 122 and firewall 124. In another embodiment, memory 160 is one or more partitions of memory 140 described later. In an embodiment, memory 160 comprises authorization rules 162 and inventory table 164 for establishing and maintaining record of authorized and unauthorized devices that may be connected to computer 110. Memory 160 also comprises execution buffer 166 which is a temporary storage facility for pre-fetched descriptors, descriptors under execution by bus controller 122 and executed descriptors destined for the done queue of the CPU sub-system 130. In various embodiments, memory 160 further comprises additional data structures such as registers, flags, scratchpads, temporary data structures and machine executable instructions supportive of the operation of bus controller 122 and descriptor firewall 124. In select embodiments, descriptors stored in memory 160 comprise a 'Reviewed Bit' (RB) utilized for execution timing synchronization between descriptor firewall 124 and bus controller 122. The RB for each descriptor is cleared when the descriptor is initially transferred into execution buffer 166. Once descriptor firewall 124 has evaluated a descriptor against authorization rules 162, its RB is set by firewall 124. Bus controller 122 synchronizes to firewall 124 by only processing descriptors with associated RBs in the set state, wherein processing comprises executing authorized descriptors and skipping or hiding unauthorized descriptors.

Authorization rules 162 comprise a white-list and/or black-list specification of authorization criteria that define one or more devices eligible for authorized connection to data structures or drivers in memory 140. Authorization rules 162 specify authorization criteria such as authorization according to device identification attributes such as USB Product ID, Vendor ID, Class information (e.g. Class/Sub-class/Protocol description) or device usage attributes such as data bandwidth restrictions, data capacity restrictions, transfer size (e.g. file or block size) restrictions or connection time restrictions. In some embodiments, restrictions are associated with transfer types such as a block size restriction associated with a USB bulk transfer type, a bandwidth restriction associated with an isochronous transfer type or a connection time restriction associated with an isochronous transfer type. As one example of a connection timeout restriction, a defined connection type is only authorized for a limited duration, such as a thirty minute restriction placed on an isochronous audio connection. In different embodiments, rules 162 are statically defined, provided by CPU sub-system 130 or provided by an independent authorization server 170, for example under the control of a security management connection between server 170 and computer 110.

Inventory table 164 in memory 160 comprises an inventory of authorization attributes associated with devices connected to module 120. An exemplary embodiment of table 164 is presented in Table 1.

TABLE 1

Inventory Table

| Function Address | Device Topology | Device Identification | Authorization |
|---|---|---|---|
| 0 | Reserved for newly-connected devices | | |
| 1 | Device #1 Topology | Device #1 ID | Authorized |
| 2 | No Device | No Device | Not Authorized |
| 3 | Device #2 Topology | Device #2 ID | Not Authorized |
| ... | | | |
| 126 | Device #3 Topology | Device #3 ID | Authorized |
| 127 | No Device | No Device | Not Authorized |

Table 1 shows the address assignment information for the first four and last two function addresses of an exemplary set of 128 assignable addresses. Function Address 0 is a temporary assignment reserved for communications related to device setup of newly-connected devices. In the example of Table 1, Function Address 2 and Function Address 127 have no devices and a default authorization ("Not Authorized") that prevents device communications. Device #1 is an authorized device assigned to Function Address 1, with device #1 topology (for example, connected to Root Hub or another hub such as a child hub identified according to the Function Address and port number of the hub) and device #1 identification information (e.g. Product ID, Vendor ID, string descriptor information such as serial number, manufacturer information or the like). Device #2 of device #2 ID is assigned to Function Address 3, with device #2 topology. Device #2 is not authorized for communications. Device #3 with device #3 ID identification information and device #3 topology is an authorized device assigned to Function Address 126.

In some embodiments, inventory table 164 comprises a profile of usage characteristics associated with a device such as amount of data transferred, port bandwidth consumption, connection duration or other statistical measurements related to constraints imposed by the authorization rules. In some such embodiments, descriptor firewall 124 monitors the usage characteristics and changes device authorization status in response to any rules violations. In some embodiments, inventory table 164 comprises authorization rules based on endpoint criteria in addition to device identification. In one embodiment, each of the 16 endpoints of a USB device is selectivity authorized.

Execution buffer 166 comprises descriptors under execution by bus controller 122. In various embodiments, bus controller 122 fetches descriptors from lists in CPU sub-system memory in an industry compliant manner and buffers them for execution. Firewall 124 modifies the descriptors in execution buffer 166 by tagging or modifying them prior to execution as described below.

Interface module 120 connects to CPU sub-system 130 via a system bus 131 such as a Peripheral Component Interconnect (PCI), PCI-Express bus or the like. In an embodiment, CPU sub-system 130 comprises CPU 132, support circuits 134, and memory 140, collectively forming at least a portion of 'the resources' of computer 110. CPU 132 comprises one or more microprocessors or microcontrollers for executing instructions that provide the functionality of computer 110. Examples of a suitable CPU include 32-bit, 64-bit or other CPU such as Opteron or Athlon class microprocessors manufactured by AMD, Xeon, Pentium or X86 class processors manufactured by Intel, SPARC microprocessors manufactured by Sun Microsystems Inc. or a microprocessor such as a PowerPC processor manufactured by Motorola. However, any other suitable microprocessor platform may be utilized. Support circuits 134 comprise well-known circuits that facilitate operation of the CPU sub-system 130. Such support circuits include, but are not limited to, at least one of cache, power supplies, clock circuits, display drivers, and the like.

Memory 140 comprises at least one of Random Access Memory (RAM), such as DRAM, SRAM, etc., read only memory, disk drive, removable storage, optical storage, tape, CDROM, DVDROM, magneto-optical disks, EPROM, EEPROM, Flash EPROM and the like. Memory 140 stores various software programs including drivers 142 for the various peripheral devices that are intended to cooperatively operate with the host system 110. In an embodiment, drivers 142 comprise USB class drivers, core driver, hub driver and host controller driver (HCD) compatible with bus controller 122. Drivers 142 convert high level I/O requests into descriptor lists 144 executable by interface module 120. In an embodiment, lists 144 comprise Endpoint Descriptor (ED) and Transfer Descriptor (TD) lists known to the art, each list comprising isochronous or general TDs associated with Interrupt, Control, or Bulk Endpoints. According to various embodiments, descriptor lists (such as lists 144) processed by bus controller drivers (such as drivers 142) are alternatively termed "secure" descriptor lists herein.

It will be recognized by those of ordinary skill in the art that embodiments of computer 110 further comprise additional components such as mechanical housing components, connectors and other components not shown in FIG. 1 as not to unnecessarily obscure aspects of the present invention.

In various embodiments, descriptor firewall 124 utilizes one of several available transfer snooping methods for establishing device identification and providing descriptor blocking. In one embodiment, descriptor firewall 124 monitors execution buffer 166 for control transfer descriptors associated with endpoint-zero communicated by CPU sub-system 130. The control transfer descriptors are monitored for device identification information, bus assignment information or device topology information. Device identification information includes Vendor ID, Product ID, Device Class, Device SubClass, Device Protocol, Interface Class, Interface SubClass and Interface Protocol. The bus assignment information comprises the bus address assigned to the device and the device topology information includes the hub and port used by the device connection. The Function Address of a non-authorized device is flagged in inventory table 164 and transfer descriptors to endpoints other than endpoint zero at that Function Address are hidden from bus controller 122 (for example modifying the TDs as described), preventing transactions to the unauthorized device. In an embodiment in which CPU-sub-system 130 treats TD retirement timeouts as device malfunction events rather than bus controller malfunction events, TDs for unauthorized devices are not retired at all which forces a TD retirement timeout rather that a normal device timeout. (In case of a normal device timeout, the host controller generally retires a TD with an error code after it unsuccessfully attempts a transaction three times without response). Method 600 depicted in FIG. 6 and described later provides an exemplary embodiment of a device authorization method executed by an interface module such as module 120.

In other embodiments, communications with a device enumerated by CPU sub-system 130 is halted by emulating detachment of the device. In one case, an emulated port state change event is signaled to drivers 142. Such an embodiment generally requires maintenance of port state information so that the authorization state and port state change events can be managed accordingly.

Figure 2:
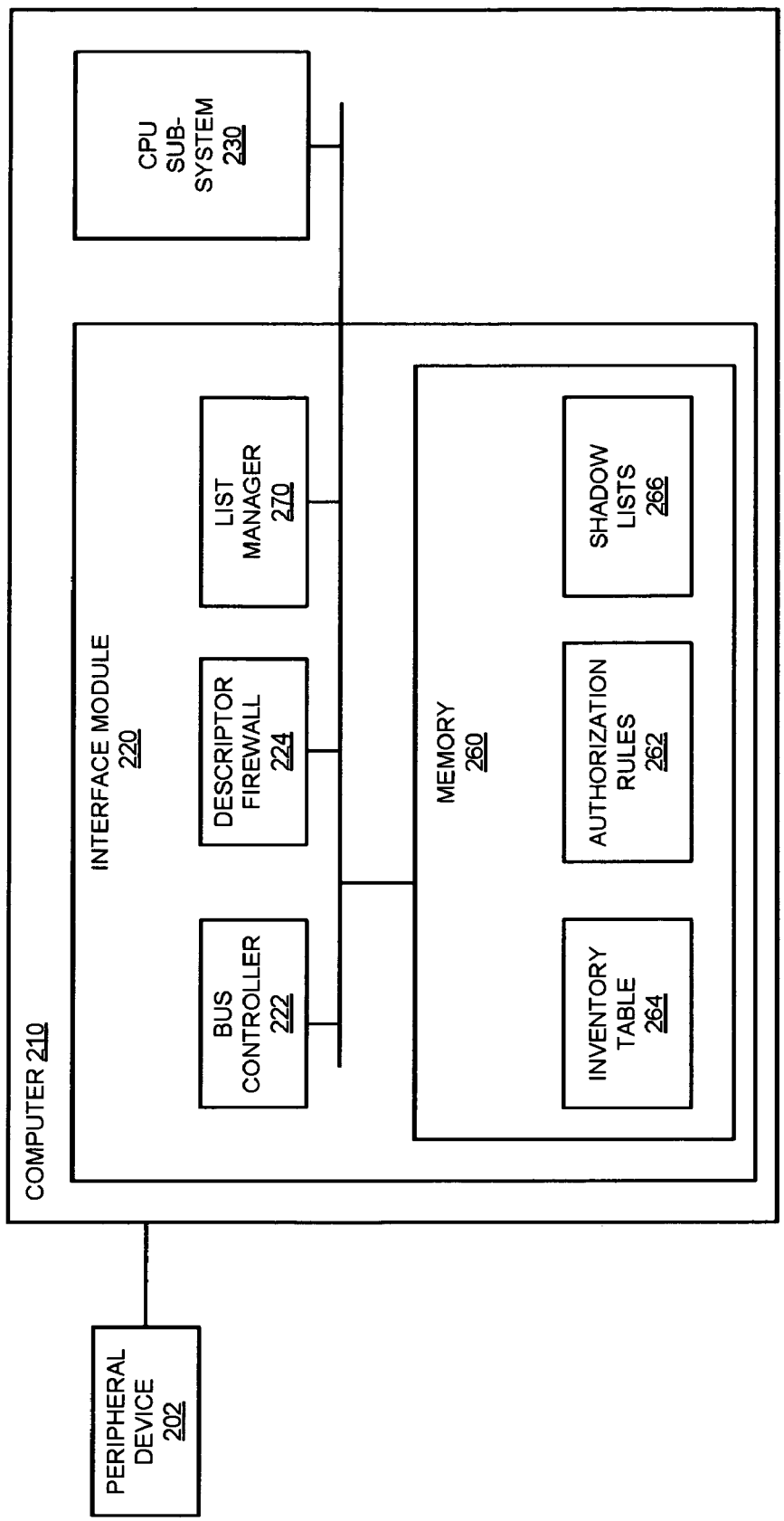
FIG. 2 is a block diagram of a computer system comprising a peripheral port for connecting a peripheral device to a host computer in which the host computer maintains shadow descriptor lists independent from a CPU sub-system and unauthorized shadow descriptors are blocked from execution.

FIG. 2 illustrates selected details of an embodiment of a computer 210 comprising a CPU subsystem 230 and a interface module 220. The interface module 220 manages communication between resources of the CPU sub-system 230 and a peripheral device 202. In this embodiment, interface module 220 incorporates shadow descriptor lists that are modified or selectively executed according to determined device authorization states or other usage restrictions.

Peripheral device 202 is substantially similar to device 102 in FIG. 1 and connects to interface module 220 which is similar to module 120 in FIG. 1 with an additional list manager 270 tasked with maintaining shadow lists 266 in memory 260. CPU sub-system 230 comprises resources substantially similar to sub-system 130 in FIG. 1, the resources including CPU, support circuits and memory with drivers and descriptor lists.

In an embodiment, list manager 270 is a processing resource (such as a MIPS, ARM or X86 class embedded microprocessor) and associated machine executable instructions or alternative processing element that shadows the descriptor lists of sub-system 230 and manages shadow lists 266 in memory 260. According to various embodiments, shadow lists (such as lists 266) processed by the bus controller (such as bus controller 222) are alternatively termed "unsecure" descriptor lists herein. Generally, list shadowing comprises maintaining one or more duplicate lists by periodically identifying updates such as additions, deletions or modifications made to an original list (such as lists 144 in FIG. 1) and applying the updates to the shadow list(s). Identification of list updates is accomplished, for example, by intercepting list update commands or traversing the list(s) and comparing descriptors to those of the shadow list. Various embodiments of a list shadowing method are described in commonly assigned U.S. patent application Ser. No. 11/278,378 entitled "System and Methods for Bridging a USB Connection" incorporated herein by reference in its entirety.

Descriptor firewall 224 is a processing resource (such as a processing resource shared with list manager 270, a MIPS, ARM or X86 class embedded microprocessor and associated machine executable instructions or alternative processing element) enabled to establish the identity of connected devices, for example by snooping control descriptors for device identification information from retired descriptors in shadow lists 266. The Function Address of a non-authorized device is flagged in inventory table 264. In an embodiment, descriptor firewall 224 also ensures that execution of unauthorized interrupt, isochronous or bulk data descriptors by bus controller 222 is prevented in compliance with authorization rules 262 as indicated for each device in inventory table 264. In an exemplary embodiment, authorization rules 262 and inventory table 264 are substantially similar to rules 162 and inventory table 164 in FIG. 1 previously described.

In an embodiment, descriptor firewall 224 periodically scans shadow lists 266 (e.g., after each time lists 266 are updated) and tags or modifies descriptors in lists 266 associated with unauthorized devices. When bus controller 222 executes the descriptors, TDs associated with authorized EDs are executed in an industry-compliant manner while TDs associated with unauthorized endpoints are hidden from bus controller 222 (in cases where descriptors are de-linked) or skipped by bus controller 222 (in cases where descriptors are tagged or some EHCI embodiments where the descriptor ACTIVE bit is negated).

In an alternative embodiment, descriptor firewall 224 operates in tandem with list manager 270 to hide TDs in CPU sub-system lists (descriptor lists 144 in FIG. 1) associated with unauthorized devices from shadow lists 266 during the list shadowing and copy operation. Interface module 220 then processes shadow lists 266 without a requirement for additional authorization processing.

In various alternative embodiments to system 200, unauthorized devices are completely hidden from CPU sub-system 230 rather than taking the approach of tagging or modifying descriptors in shadow list 266. One such embodiment comprising a hub emulator operating in conjunction with the bus controller is depicted in FIG. 3 and described below.

Figure 3:
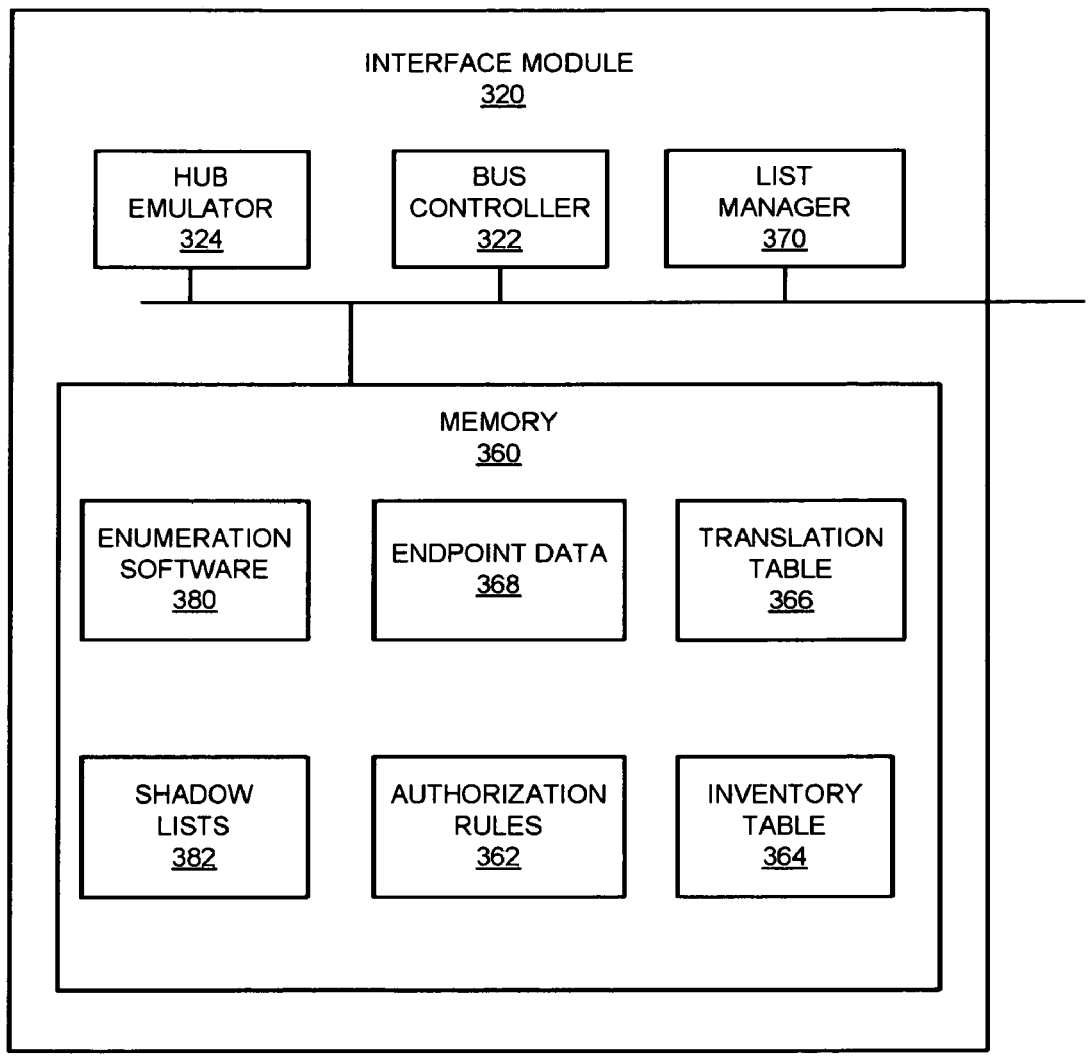
FIG. 3 is a block diagram of an interface module comprising a bus controller, hub emulator and memory.

FIG. 3 illustrates an alternative embodiment of interface module 220 of FIG. 2. Interface module 320 of FIG. 3 implements local device enumeration methods, thereby enabling unauthorized devices to be completely hidden from the CPU sub-system such as sub-system 230 in FIG. 2. In the embodiment of FIG. 3, a hub emulator performs local enumeration of all attached devices and only presents authorized devices to the CPU sub-system for subsequent communication.

In an embodiment, interface module 320 comprises bus controller 322, hub emulator 324 and list manager 370 coupled to memory 360 by one or more busses such as one or more computer data busses and/or embedded busses as described for module 220 in FIG. 2.

In an embodiment, bus controller 322 comprises at least one of an OHCI bus controller, UHCI bus controller, EHCI bus controller or WHCI bus controller previously described. Given that descriptors issued by the CPU for execution are inherently authorized for processing, tagging mechanisms as described for bus controller 122 in FIG. 1 are not required.

In an embodiment, hub emulator 324 is a processing resource (such as a MIPS, ARM or X86 class embedded microprocessor) or alternative processing element enabled to execute enumeration software, maintain a set of port status bits visible to the CPU sub-system and manage a set of emulated descriptor lists. Emulator 324 also includes an address translation capability that manages a map function address associations between the function addresses assigned by device drivers (e.g., drivers 142 in FIG. 1) and the function addresses assigned by emulator 324. The map of function addresses is stored as translation table 366 in memory 360.

In various embodiments, list manager 370 is substantially similar to list manager 270 depicted in FIG. 2 described.

Memory 360 comprises authorization rules 362 and inventory table 364 substantially similar to rules 162 and table 164 respectively in FIG. 1. Memory 360 further comprises enumeration software 380, endpoint data 368, and shadow lists 382. Enumeration software 380 comprises a set of machine executable instructions that partially enumerate each device when a connection event is detected. In an embodiment, physical hubs are not visible to drivers 142 and interrupt transfer descriptors are scheduled to poll the hub status change endpoints and control transfer descriptors are scheduled to perform enumeration in shadow lists 382. Shadow lists 382 comprise both authorized and unauthorized device endpoints whereas lists in CPU memory of a local enumeration embodiment comprise only authorized device endpoints. Insertion of control descriptors in shadow lists 382 is scheduled such that the integrity of other concurrent transactions such as enumeration of authorized devices by drivers 142 is preserved.

In another embodiment, emulator 324 intercepts enumeration commands from CPU-sub-system 230 (for example, by extracting the commands from shadow lists 382) and performs local enumeration first to determine if a device should be authorized for connection. If the device is not authorized, an invalid device descriptor (e.g. wrong length or bad type descriptor type field) is returned or the TD is retired with a timeout condition code.

In some such embodiments, the connection of any newly-attached device is masked from CPU-sub-system 230 until the newly attached device is partially enumerated to establish its identity which is then used to determine the device authorization state by comparing the device identity to authorization rules 362. Connection masking is accomplished in any of several ways. In an exemplary embodiment, hub status change TDs are intercepted by firewall 324 and re-queued for communication to CPU sub-system 230 once authorization is confirmed. In the event a port status TD is identified and the device is not authorized for connection, the status change is overwritten to mask the new connection status before the TD is communicated to sub-system 230.

Connection events are detected by monitoring the host controller register interface of bus controller 322 and descriptors associated with external hubs. While root hub connection events are generally reported through the host controller register interface, connection events associated with external hubs are generally encapsulated inside hub TDs. In an embodiment, emulator 324 maintains a record of which endpoints are hubs so that TDs belonging to each hub can be inspected. Hub TDs are then inspected, for example during or after retirement, for the attachment of devices to the hub.

In an embodiment, emulator 324 polls hub status change endpoints and proceeds with partial device enumeration (e.g. requesting a device descriptor comprising device identification information) following a status change when a device is connected (to a powered port). While essentially all enumerated devices are assigned function addresses by emulator 324, only authorized devices are made visible to CPU sub-system 230 for subsequent communication. Specifically, in the case of an authorized device, emulator 324 emulates a device attachment event by reflecting a hub status change that is visible to the original hub driver (ref. drivers 142 in FIG. 1). The original drivers then enumerate the device (connected behind the hub emulator) by communicating with emulator 324. Such device enumeration includes assigning the device a function address used by the CPU sub-system. Emulator 324 then maintains translation table 366 which maps the function address assigned by the original drivers in memory 140 to the locally assigned function address used by the device. Following enumeration, emulator 324 translates addresses between the two domains. In such an embodiment, driver software such as drivers 142 operate in an industry-compliant manner without any need for modification. In some embodiments, hub emulator 324 changes the addresses of authorized devices in order to present the devices to bus controller 322 as a continuous device address set.

Emulator 324 pre-processes descriptors before execution by bus controller 322 and retires unauthorized descriptors without the knowledge of bus controller 322. For example, drivers 142 in CPU sub-system 130 create an ED and queue TDs in order to send commands to the bus controller in an industry compliant manner. Hub emulator 324 recognizes these TDs as destined for an industry-compliant bus controller. Emulator 324 then hides the TDs from bus controller 322 and retires them in the same manner as if retired by bus controller 322.

In some such embodiments, all physical hubs are managed by emulator 324 and are hidden from drivers 142 (ref. FIG. 1); the only hub seen by drivers 142 is emulator 324. In one such embodiment, emulator 324 comprises a descriptor pre-processing engine which performs the address translation on the fly. In another such embodiment, address translation is performed by list manager 370 when the shadow lists are constructed and maintained.

Figure 4:
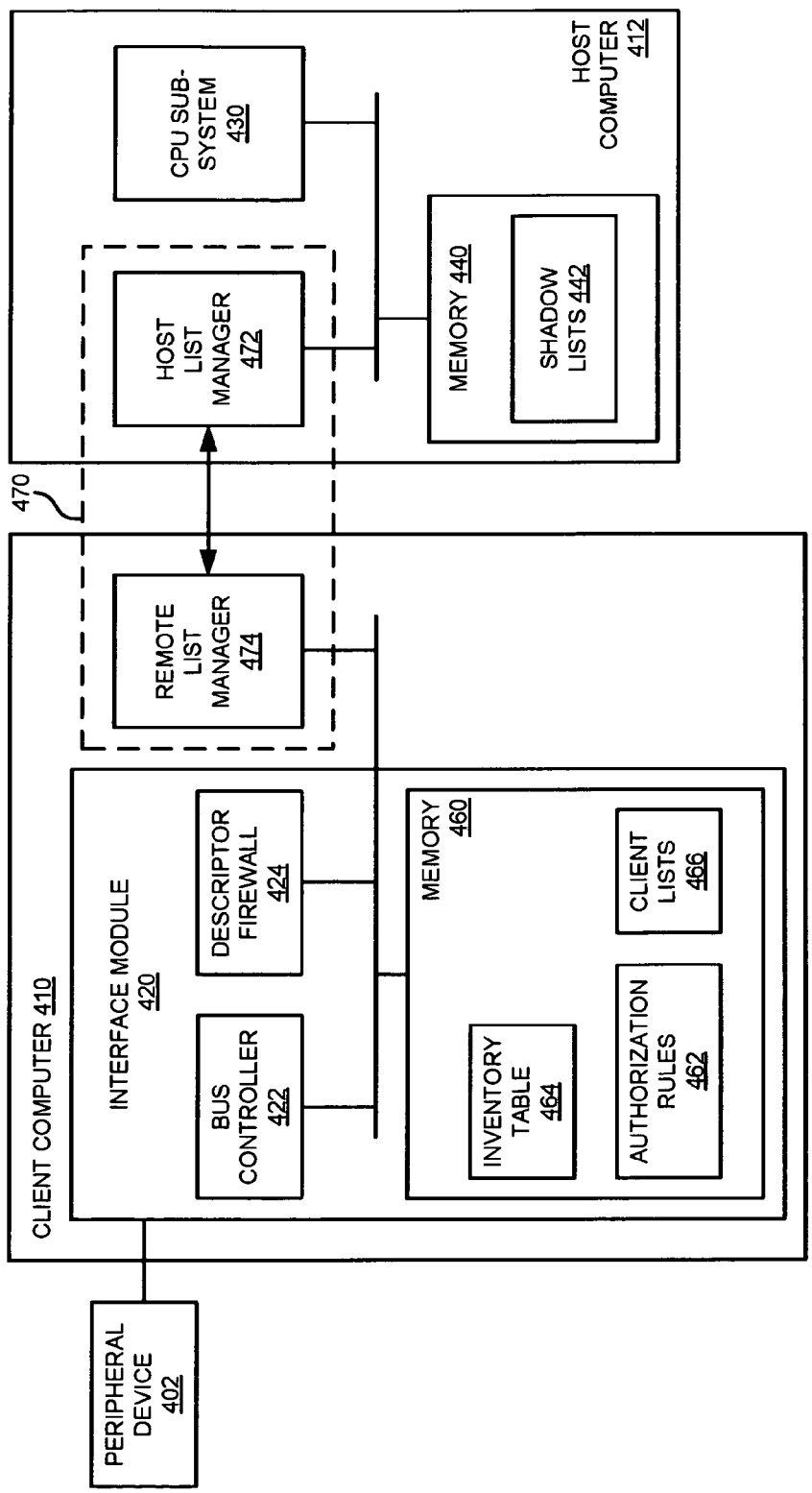
FIG. 4 is a block diagram of a computer system comprising a peripheral port for connecting a peripheral device to a client computer with client descriptor lists coupled to a host computer with shadow descriptor lists independent from a CPU sub-system and wherein unauthorized client descriptors are blocked from execution.

FIG. 4 illustrates selected details of an embodiment of a computer system 400 comprising a host computer 412 coupled to a client computer 410. The client computer 410 comprises an interface module 420 for coupling the client computer 410 to a peripheral device 402. The interface module 420 manage communication between the peripheral devices 402 and resources of the computer system. In various embodiments, client computer 410 is a client terminal in a networked computer system (e.g., in an embodiment, system 400 is a remote computing system). Such client terminals include thin clients, personal computers, workstations, Personal Digital Assistants (PDAs), wireless devices, storage systems and the like. In various embodiments, host computer 412 is a computer such as a personal computer, computer server or the like. In various embodiments, client computer 410 is communicatively coupled with host computer 412 by a network comprising a communication system (e.g., the Internet, LAN, WAN, and the like) that connects computer systems completely by wire, cable, fiber optic, and/or wireless links facilitated by various types of well-known network elements, such as hubs, switches, routers, and the like. In one embodiment the network employs various well-known protocols (e.g., TCP/IP and the like) to communicate information amongst the network resources. For example, in some embodiments, the network employs part of the Internet.

Computers 410 and 412 are coupled by bridged peripheral bus controller 470 comprising host list manager 472 and remote list manager 474. An embodiment of a bridged USB controller is described in Teradici U.S. patent application Ser. No. 11/278,378, previously referenced. Client computer 410 incorporates security processing functions to prevent unauthorized devices from accessing CPU sub-system 430 in computer 412.

In various embodiments, peripheral device 402 is substantially similar to device 102 in FIG. 1. Device 402 connects to interface module 420 similar to module 220 in FIG. 2 with list manager 474 depicted outside the bounds of module 420. CPU sub-system 430 comprises resources substantially similar to sub-system 130 in FIG. 1, the resources including CPU, support circuits and memory with drivers and descriptor lists.

Host list manager 472 is a processing resource (such as a MIPS, ARM or X86 class embedded microprocessor and associated machine executable instructions or a logic sequencer connected to CPU sub-system 430 by a system bus such as a Peripheral Component Interconnect (PCI), PCI-Express bus or the like. Host list manager 472 is enabled to generate shadow lists 442 in memory 440 by shadowing the descriptor lists of sub-system 430 (ref lists 144 in FIG. 1) using list shadowing methods previously referenced.

Bridged controller 470 communicates host list updates to client lists 466 maintained in memory 460. Interface module 420 processes client lists 466 subject to authorization rules 462 and address assignments in table 464. In various embodiments, authorization rules 462 and inventory table 464 are substantially similar to rules 162 and inventory table 164 in FIG. 1 previously described. Module 420 incorporates bus controller 422 substantially similar to bus controller 222 in FIG. 2.

In an embodiment, remote list manager 474 is a processing resource (such as a MIPS, ARM or X86 class embedded microprocessor and associated machine executable instructions or alternative processing element) that receives descriptor updates from host list manager 472 and returns descriptor updates such as retired descriptors to host list manager 472 for retirement. In various embodiments, remote list manager delays retirement of descriptors based on data bandwidth restrictions posted in authorization rules table 462.

In an embodiment, descriptor firewall 424 is a processing resource similar to firewall 242 depicted in FIG. 2 (such as an embedded microprocessor or alternative processing element) enabled to establish the identity of connected devices, for example by snooping control descriptors for device identification information from retired descriptors in shadow lists 466 using transfer snooping methods described in association with FIG. 2.

In an embodiment, descriptor firewall 424 ensures that only authorized devices connect to host computer 412 by either preventing successful enumeration of unauthorized devices or preventing bus controller 422 from successful execution of interrupt, isochronous or bulk data descriptor processing, for example using skipping or TD blocking approaches described for firewall 124 in FIG. 1. In some embodiments of system 400, descriptor firewall 424 is located in the communication path between remote list manager 474 and memory 460. Firewall 424 is enabled to hide unauthorized TDs present in shadow lists 442 from client lists 462, In such cases, interface module 420 is thereby enabled to process client lists 462 without any requirement for further authorization processing. In another alternative embodiment that uses local enumeration methods, interface module 420 is substituted with an interface module comparable to interface module 320 illustrated in FIG. 3. In such an alternative embodiment, the CPU sub-system only enumerates authorized devices and therefore all descriptors issued by the CPU in client lists 466 are inherently authorized for execution by the interface module.

Figure 5:
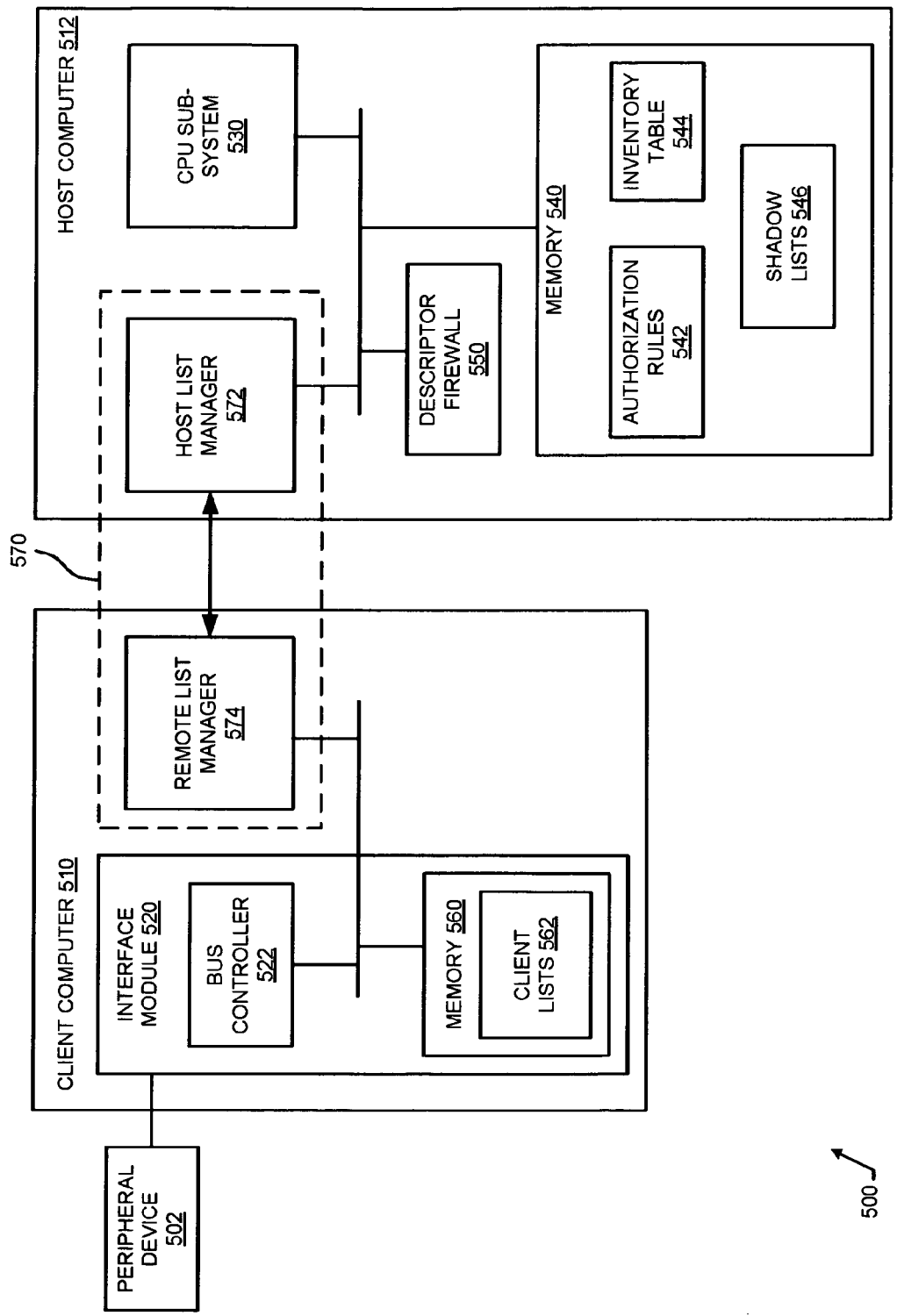
FIG. 5 is a block diagram of a computer system comprising a peripheral port for connecting a peripheral device to a client computer coupled to a host computer with shadow descriptor lists wherein unauthorized shadow descriptors are hidden from the client computer.

System 500 illustrated in FIG. 5 is an alternative embodiment to computer system 400 in FIG. 4 in which authorization processing functions are performed at the host computer rather than the client computer. Computer system 500 comprises a host computer 512 coupled to a client computer 510. The client computer 510 comprises an interface module 520 for coupling the client computer to a peripheral device 502. The interface module 520 manages communication between the peripheral device 502 and resources of the host computer 512. Client computer 510 is a remote terminal, thin client, personal computer or the like communicatively coupled with host computer 512 by bridged peripheral bus controller 570 comprising host list manager 572 and remote list manager 574 as described for bridged controller 470 in FIG. 4. Peripheral device 502 is substantially similar to device 402 in FIG. 4. Device 502 connects to interface module 520 comprising bus controller 522 (substantially similar to bus controller 422 in FIG. 4) and memory 560. Memory 560 comprises client lists 562. Note that authorization rules 542 and inventory table 544 are located in memory of host computer 512 for access by descriptor firewall 550, also located in computer 512. CPU sub-system 530 includes resources comprising CPU, support circuits and memory as described for sub-system 430 in FIG. 4.

Host list manager 572 shadows the descriptor lists of sub-system 530 and manages shadow lists 546 in memory 540, for example using list shadowing methods described in Teradici U.S. patent application Ser. No. 11/278,378 previously referenced. In some embodiments, memory 540 is independent of the memory associated with CPU sub-system 530, for example SRAM or DRAM coupled to descriptor firewall 550. In other embodiments, memory 540 is a region of the CPU sub-system memory (ref. memory 140 in FIG. 1). In an exemplary virtualized computer environment, rules 542, table 544 and unsecure shadow lists 546 are located in memory assigned to the Hypervisor domain of CPU sub-system 530 while the secure original descriptor lists (ref. lists 144 in FIG. 1) are maintained in memory assigned to one or more virtual machines operating in CPU sub-system 530.

Firewall 550 processes descriptors of shadow lists 546, for example, by hiding transfer descriptors during the execution of shadowing methods, prior to descriptors being transferred to client lists 562 in memory 560 or before processed descriptors are returned from shadow lists 546 to CPU sub-system 530. In an embodiment, memory 540 maintains authorization rules 542 and inventory table 544 used by firewall 550 to determine device authorization parameters, for example as previously described for rules 162 and inventory table 164 in FIG. 1. In some embodiments, address assignments and rules are mirrored from client computer 510. In another embodiments, assignments and rules are constructed at host computer 512, for example using authorization rules provided directly by an authorization server connected to host computer 512 and device assignment information provided by list manager 572.

In various embodiments, list manager 572 of bridged controller 570 communicates host list updates to list manager 574 which are maintained as client lists 562 in memory 560. Bus controller 522 then processes client lists 562 without further client-side authorization processing methods or structures. Retired descriptors are returned from client lists 562 to shadow lists 546 and then to CPU sub-system 530 by bridged controller 570 once executed.

In some embodiments, various combinations of all or portions of functions performed by a computer (such as computer 110 of FIG. 1, computer 210 in FIG. 2, computers 410 and 412 of FIG. 4, or computers 510 and 512 of FIG. 5), including interface module 120 of FIG. 1, interface module 220 of FIG. 2, interface module 320 of FIG. 3, interface module 420, list managers 472 and 474 in FIG. 4, list managers 572 and 574 and firewall 550 in FIG. 5 and portions of a processor, a microprocessor, or a programmable controller providing all or portions of the aforementioned functions, are specified by descriptions compatible with processing by a computer system (e.g. Verilog, VHDL, or any similar hardware description language). In various embodiments the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In select alternative embodiments, at least part of the descriptor firewall (such as firewall 124 in FIG. 1, firewall 224 in FIG. 2, or firewall 550 in FIG. 5) is executed as a set of machine-readable instructions by the CPU (or auxiliary processing function) of the CPU sub-system. In some such embodiments, the CPU sub-system comprises a Hypervisor such as ESX SERVER from VMWARE Corporation, XEN-SERVER from CITRIX Corporation or HYPER-V from MICROSOFT Corporation which coordinates the execution schedule of a set of virtual machines (VMs) and the interaction of the virtual machines and various hardware components, for example, by ensuring non-overlapping memory ranges available to each VM in the system. Each VM under control of the Hypervisor is an autonomous operating system environment with one or more applications and related drivers. In an exemplary embodiment, each VM comprises an operating system such as a WINDOWS operating system from MICROSOFT, Inc. for example WINDOWS XP or WINDOWS VISTA, a LINUX operating system available from many vendors or a UNIX operating system, also available from many vendors. In such embodiments, at least part of the descriptor firewall executes (in the Hypervisor domain such as 'Dom0' or an I/O domain primarily tasked with the execution of driver software) by accessing the descriptor lists associated with USB device drivers of one or more VM domains and performs the descriptor authorization methods described herein.

Figure 6:
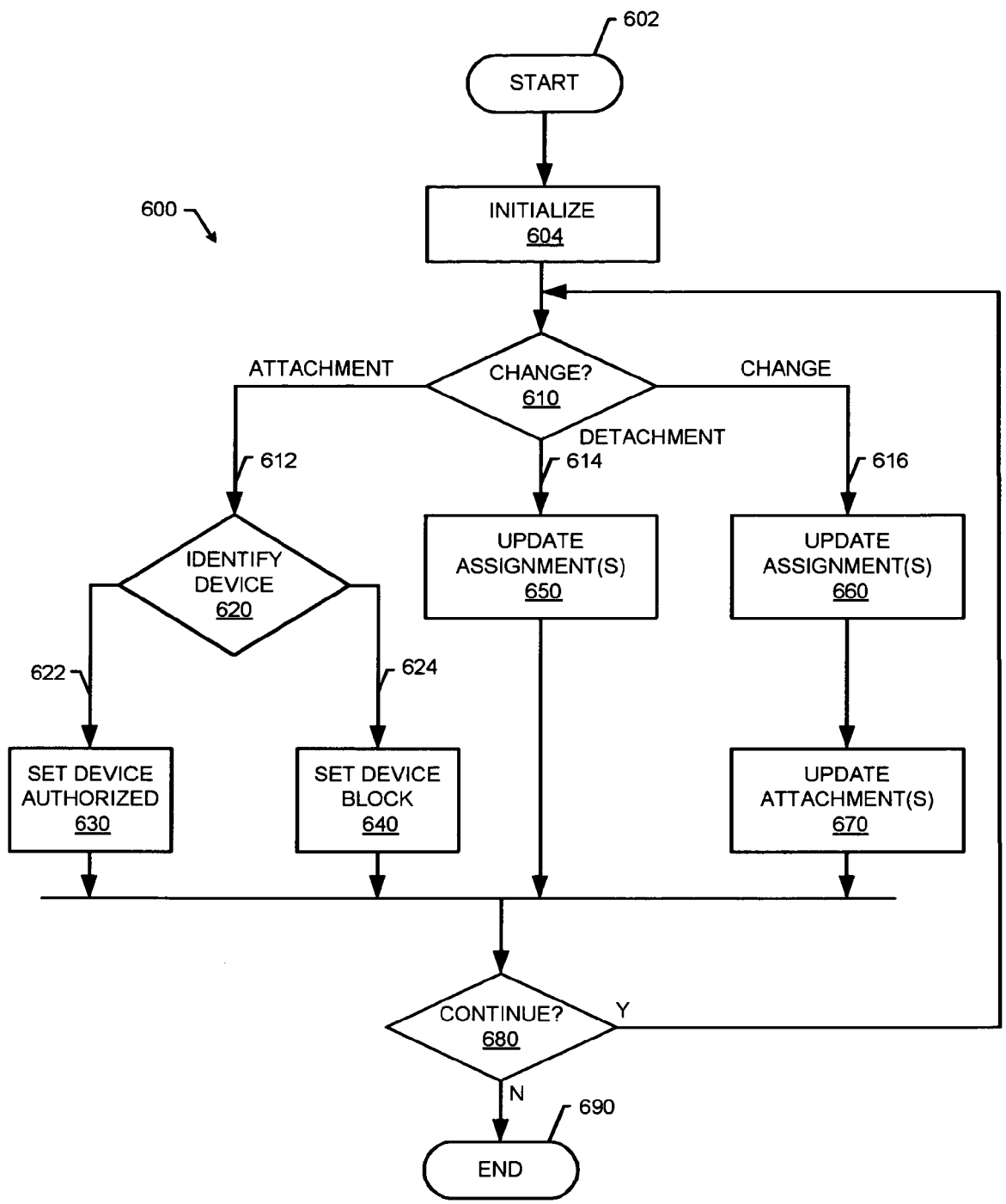
FIG. 6 is a flow diagram of an embodiment of a method for authorizing a device according to information retrieved from device descriptors in accordance with one embodiment of the invention.

FIG. 6 depicts a flow diagram of an embodiment of a method 600 for preventing unauthorized descriptor transactions between a peripheral device and software drivers of a computer based on an assessment of device identification information in light of at least one authorization criterion. This method may generally be performed by any of the embodiments shown and/or described above with respect to FIGS. 1-5.

Method 600 starts at step 602 and proceeds to step 604 ('Initialize'). In various embodiments, initialization comprises initializing the CPU sub-system of the computer, memory, software and software drivers and the interface module with bus controller, memory and descriptor firewall. In a remote computing embodiment, initialization comprises initialization of host and client computers and establishment of a connection between the computers in preparation for communication of descriptors between them. Additionally, initialization comprises the loading authorization rules from memory such as ROM, an authorization server or the like. The inventory table (ref table 164 in FIG. 1) is initialized, for example by setting every function address to an unauthorized status and clearing previous device associations.

As a next step 610 ('Change'), method 600 monitors for change in device attachment status or function assignment. Changes in device attachment status are recognizable using one of various methods. One approach is to intercept control transfer descriptors between the device and original drivers (e.g., drivers 142 in FIG. 1), for example by snooping endpoint zero control transactions initiated by the drivers following an attachment event (such as a hub status change event after a device is attached). In some embodiments comprising a hub emulator, attachment or detachment events are recognized by a hub emulator such as emulator 324 of FIG. 3.

In case 612, an attachment event is recognized and the newly attached device is identified for authorization as a next step 620 ('Identify Device'). In various embodiments where control information is intercepted, the device identity is gleaned from the enumeration information (e.g., the device descriptor) returned from the device to the drivers, the bus address assigned by the drivers and the hub and port topology for each device. In some embodiments comprising a hub emulator, such as interface module 330 in FIG. 3, the emulator enumerates the device by setting the device to a USB 'Default State' and requesting the device descriptor comprising device identification information. The device identification information retrieved from the device is compared with corresponding identification information for authorized devices (e.g., a white-list comprising information associated with authorized devices or a blacklist comprising information associated with unauthorized devices). In an embodiment comprising descriptor firewall such as system 100 in FIG. 1, computer 210 in FIG. 2, system 400 in FIG. 4 or system 500 in FIG. 5, the descriptor firewall is enabled to perform the comparison function. In an embodiment comprising a hub emulator, such as emulator 324 in FIG. 3, the hub emulator is enabled to perform the comparison function.

In case 622, the device qualifies for authorization (for example a matching identity in a white list of authorized devices) so the device is marked authorized in the inventory table as a next step 630 ('Set Device Authorized'). The inventory table is also updated to reflect the device topology and ID information at the newly-assigned function address. In some embodiments comprising a hub emulator, the emulator completes enumeration and signals a device attachment event to the original drivers as previously described. In one such embodiment, the original drivers re-enumerate the device with the hub emulator enabled to provide address translation. In another such embodiment, the hub emulator uses device information collected to respond to enumeration commands issued by the original drivers.

In case 624, the device does not qualify for authorization so transactions are prevented as step 640 ('Set Device Block'). Device communication is blocked using one of several available methods. In some embodiments, correct or complete device enumeration is prevented. As one example, an invalid device descriptor is returned to the original drivers (e.g., a descriptor comprising an incorrect length or bad type field) so that configuration cannot be completed. As another example where a hub emulator has been enabled (ref emulator 324 in FIG. 3), attachment events (e.g., communication of a hub status change TD) are masked from the original drivers. Consequently, device drivers are not loaded for the unauthorized device and communications between the newly attached device and driver software is inherently prevented. In other embodiments, device enumeration is completed but post-enumeration device communications with unauthorized devices is blocked. For example, in an embodiment, transfer descriptors to endpoints other than the zero endpoint are hidden from the bus controller in the interface module (e.g., bus controller 122 in FIG. 1), for example by de-linking them from the unauthorized ED and thereby preventing data exchange with the device. In another embodiment, transfer descriptors for unauthorized devices are retired with an error code. In another embodiment, OUT endpoints are blocked. (Such an embodiment has the limitation that endpoint zero remains available for outbound data transfers in some circumstances).

In case 614, a detachment is observed, for example when a device is unplugged or powered down. The inventory table is updated as step 650 ('Update Assignment(s)') to reflect that no device is attached at the function address and that the address is no longer authorized. In case of a hub detachment, all function addresses associated with the hub, including function addresses associated with child hubs are updated to reflect the detachment.

In case 616, a change in assignment is detected, for example in a case where authorization rules change or a host driver re-assigns a device to a different function address (e.g. by issuing an "unconfigure" command followed by a new address assignment). In case of one or more function address changes, the inventory table is updated as step 660 (Update Assignment') to reflect the new function addresses for devices with changed addresses.

In case of an authorization rule change, affected attachments are updated as a next step 670 ('Update Attachment(s)'). Previously attached devices are evaluated in light of the updated authorization rules and a new authorization status assigned to affected devices. Devices that have transitioned from an authorized state to an unauthorized state are prevented from further communications, for example using device blocking tactics described in step 640. Devices that have transitioned from an unauthorized state to an authorized state are enabled for communications. In an embodiment comprising a hub emulator, a hub status change is made visible to the original drivers to preempt enumeration. In some embodiments where enumeration was allowed but subsequent communications prevented, transfer descriptors to endpoints other than the zero endpoint are no longer hidden from the bus controller. However, in some such embodiments, it may be necessary to reset or re-attach the device for it to become operable.

At step 680, the method 600 queries whether the method should continue, i.e., return to step 610 to await another bus state change. If the query is affirmatively answered, the method 600 proceeds to step 610. If the query is negatively answered, the method 600 proceeds to step 690 and ends.

While the foregoing is directed to embodiments of the present invention, other and further embodiments of the invention may be devised without departing from the basic scope thereof, and the scope thereof is determined by the claims that follow.

The invention claimed is:

1. A method of managing a peripheral port of a computer system comprising:
identifying, within the computer system, a descriptor list for communicating data with a peripheral device, wherein the descriptor list comprises transfer commands generated by a bus controller driver of a Central Processing Unit (CPU) of the computer system and executable by a bus controller for the peripheral port; and
manipulating the descriptor list to manage communications via the peripheral port between the peripheral device and resources of the CPU of the computer system, wherein manipulating the descriptor list comprises altering information in the descriptor list to selectively prevent the communication of the data, wherein the peripheral device is located at a remote computer and the resources of the CPU of the computer system are located at a host computer, wherein the remote computer and the host computer are coupled to one another through a network, and wherein the remote computer comprises the peripheral port, wherein manipulating comprises managing a shadow list in the remote computer, the shadow list associated with the descriptor list.

2. The method of claim 1 wherein manipulating comprises:
determining whether the peripheral device is authorized to communicate with resources of the CPU of the computer system; and
manipulating the descriptor list to restrict communications between the peripheral device and the resources of the CPU of the computer system.

3. The method of claim 1 further comprising, upon manipulating the descriptor list, selectively enabling communications between the peripheral device and the resources of the CPU of the computer system.

4. The method of claim 1 wherein the peripheral device is a USB device.

5. The method of claim 1 wherein manipulating comprises:
determining whether the peripheral device is authorized to communicate with the resources of the CPU of the computer system; and
manipulating the shadow list to restrict communications between the peripheral device and the resources of the CPU of the computer system.

6. The method of claim 1 wherein manipulating the descriptor list comprises:
determining whether the peripheral device is authorized to communicate with the resources of the computer system; and
manipulating the association between the shadow list and the descriptor list to restrict communications between the peripheral device and the resources of the CPU of the computer system.

7. A method of managing a peripheral port of a computer system comprising:
intercepting, between a bus controller for the peripheral port and a bus driver, the bus driver for the bus controller and executed on a Central Processing Unit (CPU) of the computer system, peripheral identification information communicated from a peripheral device, through the peripheral port, to the bus controller;
associating the peripheral identification information with at least one authorization criterion to establish a device authorization; and
managing communications between the peripheral port and resources of the computer system, the managing communications comprising altering, based on the device authorization, information in a descriptor list generated by the bus driver, wherein the descriptor list comprises commands executable by the bus controller for transferring data with the peripheral device through the peripheral port, wherein the intercepting comprises, responsive to a hub status change, performing a hub emulation to at least partially enumerate the peripheral device, and the managing step further comprises emulating a peripheral device attachment by presenting the hub status change to the bus controller only if the device authorization is granted, and wherein performing the hub emulation further comprises managing at least one shadow descriptor list, the at least one shadow descriptor list for filtering communications with the peripheral port.

8. The method of claim 7 wherein the peripheral device is an unauthorized USB peripheral device, and wherein the altering information in the descriptor list prevents data transfers related to the unauthorized USB peripheral device.

9. The method of claim 8 wherein the peripheral identification information comprises at least one of a USB Product identification, a USB Vendor identification, a USB class description, a USB sub-class description or a USB protocol description.

10. The method of claim 7 wherein managing comprises controlling communications between the resources of the computer system and the peripheral device.

11. The method of claim 7 wherein the descriptor list comprises the peripheral identification information and the method further comprises manipulating the descriptor list to control communication between the peripheral device and the resources of the computer system.

12. The method of claim 11 wherein managing communications comprises:
passing content of the descriptor list to the bus controller if the peripheral device is authorized.

13. The method of claim 11 wherein managing communications comprises:
presenting an authorized descriptor to the bus controller if the peripheral device is authorized, the authorized descriptor comprising content of the descriptor list, the authorized descriptor enabled to allow communications with the peripheral device.

14. The method of claim 11 wherein managing communications comprises:
passing content of the descriptor list in a modified form to the bus controller if the peripheral device is unauthorized.

15. The method of claim 11 wherein the descriptor list comprises an unauthorized descriptor if the peripheral device is unauthorized, wherein managing communications comprises preventing the bus controller from communicating content associated with the unauthorized descriptor with the peripheral device.

16. The method of claim 15 wherein preventing comprises:
marking the unauthorized descriptor, the marking indicating to the bus controller to disallow communications with the peripheral device; or
maintaining a shadow descriptor list comprising content of the descriptor list and absent of content of the unauthorized descriptor.

17. The method of claim 16 wherein the bus controller comprises an ability to selectively process descriptors.

18. The method of claim 7 further comprising:
masking, from the resources of the computer system, a connection between the peripheral device and the bus controller until the peripheral device is authorized.

19. The method of claim 18 wherein masking comprises delaying a queuing of a peripheral port status change transfer descriptor.

20. The method of claim 7 further comprising:
responsive to a connection event, enabling an interface module; and
performing device enumeration, wherein the device enumeration is performed by presenting control transfer operations to the bus controller.

21. The method of claim 20 wherein the computer system comprises a remote computer coupled to a host computer via a network, the peripheral port is a port in the remote computer.

22. The method of claim 21 wherein the host computer comprises the resources of the computer system.

23. The method of claim 7 wherein the at least one authorization criterion is provided by an independent authorization server.

24. The method of claim 7 wherein the intercepting comprises:
performing at least partial enumeration of the peripheral device if the authorization is not yet established.

25. The method of claim 7 wherein performing the hub emulation comprises:
performing a translation between function addresses assigned by the hub emulation and function addresses assigned by the resources of the computer system.

26. The method of claim 7 wherein intercepting peripheral identification information comprises monitoring a descriptor list associated with the bus controller.

27. Apparatus for managing a peripheral port of a computer system comprising:
a descriptor firewall coupled to memory, the memory comprising (i) secure descriptor lists generated by bus controller driver software and comprising data transfer commands for the peripheral port, and (ii) unsecure descriptor lists, executable by a bus controller to transfer data via the peripheral port;
wherein the descriptor firewall is enabled to generate at least part of the unsecure descriptor lists, the at least part of the unsecure descriptor lists defined by (iii) devices coupled to the peripheral port, (iv) management criteria, and (v) at least part of the data transfer commands of the secure descriptor lists altered to prevent data transfers related to an unauthorized peripheral device; and
wherein the descriptor firewall is further enabled to process at least part of the secure descriptor lists based on the unsecure descriptor lists executed by the bus controller.

28. The apparatus claim of 27 wherein the memory comprises a first memory comprising the secure descriptor lists, where in the memory further comprises a second memory comprising the unsecure descriptor lists, wherein the descriptor firewall is coupled between the first memory and the second memory.

29. The apparatus of claim 28 wherein the computer system comprises a remote computer coupled to a host computer through a network, the first memory is a portion of the host computer and the second memory is a portion of the remote computer.

30. Apparatus for managing a peripheral port of a computer system comprising:
a bus controller coupled between the peripheral port and a memory, wherein the memory stores at least one descriptor list comprising altered data transfer commands and the bus controller is enabled to execute the altered data transfer commands of the at least one descriptor list to transfer data via the peripheral port; and
a descriptor firewall coupled between the memory and a CPU sub-system of the computer system, the descriptor firewall enabled to manage the at least one descriptor list according to authorization criteria to prevent data transfers related to an unauthorized peripheral device by generating the altered data transfer commands from original data transfer commands generated by the CPU sub-system.

31. The apparatus of claim 30 wherein the computer system comprises a computer containing the bus controller, peripheral port, memory, descriptor firewall and CPU sub-system.

32. The apparatus of claim 30 wherein the computer system comprises a remote computer and a host computer, the descriptor firewall, bus controller and memory are located in the remote computer.

33. The apparatus of claim 30 wherein the computer system comprises a remote computer and a host computer, the bus controller and memory are located in the remote computer and the descriptor firewall is located in the host computer.

34. A computer readable storage medium for storing computer instructions that, when executed by a processor within a computer system, cause the processor to perform a method comprising:
generating at least part of unsecure descriptor lists, the unsecure descriptor lists defined by (i) devices coupled to a peripheral port, (ii) management criteria, and (iii) data transfer commands of secure descriptor lists altered to prevent data transfers related to an unauthorized peripheral device; and
processing at least part of the secure descriptor lists in relation to the at least part of the unsecure descriptor lists executed to transfer data via the peripheral port and the management criteria.

35. The computer readable storage medium of claim 34 wherein the method further comprises storing the unsecure descriptor lists in a first memory and storing the secured descriptor lists in a second memory.

36. The computer readable storage medium of claim 35 wherein the computer system comprises a host computer coupled to a remote computer through a network, the first memory is a portion of the host computer and the second memory is a portion of the second memory.

37. The computer readable storage medium of claim 35 wherein processing comprises transferring a modified version of a USB descriptor between the unsecure descriptor lists and the secure descriptor lists, the transferring the modified version associated with at least one authorization criterion, the at least one authorization criterion defining communication restrictions between at least one peripheral device and resources of the computer system.

* * * * *